United States Patent [19]

Garmon

[11] Patent Number: 4,946,239
[45] Date of Patent: Aug. 7, 1990

[54] OPTICAL POWER ISOLATOR

[75] Inventor: Jeff P. Garmon, Marietta, Ga.

[73] Assignee: Georgia Tech Research Corporation, Atlanta, Ga.

[21] Appl. No.: 249,828

[22] Filed: Sep. 27, 1988

[51] Int. Cl.$^5$ .............................................. G02B 6/18
[52] U.S. Cl. .............................. 350/96.31; 350/96.18; 350/96.30
[58] Field of Search ............... 350/96.15, 96.16, 96.18, 350/96.29, 96.30, 96.31

[56] References Cited

U.S. PATENT DOCUMENTS

| | | | |
|---|---|---|---|
| 3,832,028 | 8/1974 | Kapron | 350/96.31 |
| 4,201,447 | 5/1980 | Thompson et al. | 350/96.31 |
| 4,452,508 | 6/1984 | Beales et al. | 350/96.31 |
| 4,521,070 | 4/1985 | Sottini et al. | 350/96.15 |

OTHER PUBLICATIONS

Bludau and Rossberg, "Low-Loss Laser-to-Fiber Coupling with Negligible Optical Feedback", *Journal of Lightwave Technology*, vol. LT-3, No. 2, pp. 294-302, Apr. 1985.

Kawano et al., "A New Confocal Combination Lens Method for a Laser-Diode Module Using a Single-Mode Fiber", *Journal of Lightwave Technology*, vol. LT-3, No. 4, pp. 739-745, Aug., 1985.

Sugie and Saruwatari, "Distributed Feedback Laser Diode (DFB-LD) to Single-Mode Fiber Coupling Module with Optical Isolator for High Bit Rate Modulation", *Journal of Lightwave Technology*, vol. LT-4, No. 2, pp. 236-245, Feb., 1986.

*Primary Examiner*—John D. Lee
*Assistant Examiner*—Phan T. Heartney
*Attorney, Agent, or Firm*—Hurt, Richardson, Garner, Todd & Cadenhead

[57] ABSTRACT

An optical isolator for improving the isolation between an optical source and a transmission link in an optical communications system. The optical isolator comprises a tapered lens including a core region and surrounding cladding material. The core region can be fabricated from graded or step index glass and the cladding can be fabricated from glass or polymer material. The core region can also be fabricated from graded or step index polymer material with the cladding fabricated from polymer material. An opaque disk of carbon-filled epoxy is deposited on the large diameter end of the optical isolator to further enhance isolation.

15 Claims, 12 Drawing Sheets

OPTICAL POWER ISOLATOR

BACKGROUND OF THE INVENTION

This invention relates generally to an optical power isolator that permits the effective collection of optical power emanating from a laser and at the same time effectively isolates the laser from the rest of a communications link. The device is suitable for both direct and coherent optical detection communications and is especially useful in reducing laser noise in high speed analog links.

The stability of the output intensity and spectral characteristics of laser-based optical systems is critically important at high bit rates. Present and future systems for communication and sensor systems are sensitive to variations in these properties. A primary cause of transmission instability is feedback into the laser cavity. This feedback may be due to internal reflection from system optics. In military applications, disruptive signals may be intentionally introduced by opposing countermeasures. Reflections from the optical system can contribute as much as 30 dB of noise to a system. Much higher intensity interference may result from deliberate jammer techniques.

Although optical isolators are commonly used in transmission paths linking lasers to optical fiber channels, present systems are not totally satisfactory. Most conventional isolators use technology based on polarizing optical elements. Commercial devices provide approximately 25 dB of isolation, and they exhibit insertion losses of up to 5 dB. These devices are only nominally usable for communication and sensor processing in general. They fall totally short of acceptable performance for use in the presence of deliberate jamming efforts.

The injection of stray light, from whatever source into the laser cavity can cause intensity fluctuations, wavelength instability, spectrum bandwidth changes, increase in laser noise, threshold level variation, and optical waveform distortion. These effects can result in degraded system performance, and they can cause data rate reduction and an increase in the bit error rate (BER).

A number of investigators have looked at various aspects of these problems. Investigators have studied the laser characteristics due to reflected optical power, the nonlinear distortion performance of semiconductor laser diodes caused by coherent reflected light, and the effect of reflected optical power on BER performance for a 500 megabits per second system. In the presence of large feedback, laser noise causes a bit error rate saturation at a level several orders of magnitude greater than that without optical feedback. For the most part, these effects may be substantial for fiber optic communication and sensor transmissions. They are very substantial for free space transmissions such as satellite laser communications and in ground linking networks.

Attempts to minimize these problems have resulted in development of several optical isolators, especially for fiber optic systems. Bludau and Rossberg, "Low-Loss Laser-to-Fiber Coupling with Negligible Optical Feedback," *Journal of Lightwave Technology*, Vol. LT-3, No. 2, pp. 294–302, April 1985 suggested use of a miniature, spherically shaped, cylindrical lens as an interface between a laser and its transmission system. Kawano, et al., "A New Confocal Combination Lens Method for a Laser-Diode Module Using a Single-Mode Fiber," *Journal of Lightwave Technology*, Vol. LT-3, No. 4, pp. 739–745, August, 1985, utilized a miniature lens combination consisting of a spherical lens, a graded index (GRIN) lens, and a rod lens. This approach provides good laser-to-laser transmission coupling, but it does little with regard to optical isolation. Sugie and Saruwatari, "Distributed Feedback Laser Diode (DFB-LD) to Single-Mode Fiber Coupling Module with Optical Isolator for High Bit Rate Modulation," *Journal of Lightwave Technology*, Vol. LT-4, No. 2, pp. 236–245, February, 1986, developed an optical isolator consisting of a yttrium iron garnet (YIG) plate and an analyzer. Optical isolation is obtained by polarization. The YIG plate-analyzer approach offers an insertion loss of about 6 dB and a reflected light isolation of about 21 dB.

In each case, these devices are only marginally satisfactory for optical fiber coupling systems. They are totally inadequate to accommodate systems subjected to optical jamming, and they are not adequate to compensate for cross talk from a receiver channel where adjacent optical paths are utilized.

An optical isolator design for satellite laser communication systems or high speed analog and digital fiber links must exhibit high isolation from external optical injection. Also, the isolator must operate without distortion of the laser output in order to avoid a requirement for excessive correcting optics. An optical isolator exhibiting 50 dB or greater isolation and less then 5 dB insertion loss would eliminate the degrading effects of optical reflection and jamming signals.

This invention involves coupling the optical power from a diode laser to either a free space communication link's transmitting optics or to an optical fiber by means of a "notched" tapered lens. The tapered lens consists of core and cladding materials of differing indices of refraction.

A number of prior art devices have made use of tapered lenses but not for achieving optical isolation. The patent to Kapron et al., U.S. Pat. No. 3,779,628, discloses a light coupler for efficiently coupling a relatively large light source to an optical waveguide. The light coupler comprises a tapered core of transparent material and a layer of transparent cladding material disposed upon the surface of the tapered core, wherein the cladding material has a refractive index less than that of the tapered core material. The large diameter end of the tapered core is optically polished and is adapted to receive light from the source of optical wave energy. The small diameter end of the tapered core is substantially aligned with the core of the optical waveguide.

The patent to Khoe et al., U.S. Pat. No. 4,671,609, discloses a monomode optical transmission fiber with a tapered end portion for efficient coupling from a diode laser into the fiber core. A lens formed by immersing the tapered end portion of the fiber in a transparent liquid material is arranged on the end portion of the fiber. The lens has a higher refractive index than that of the fiber core. The lens is given a graded refractive index to reduce reflection loss and reduce feedback radiation to the diode laser.

The patent to Hirschfeld, U.S. Pat. No. 4,654,532, discloses an optical fiber gradually tapered from a relatively large diameter entrance pupil to a substantially smaller diameter at a position longitudinally displaced from the entrance pupil. The light beam traversing the fiber is angularly compressed by the taper of the medium in which it is confined. The gradual transition increases the input beam convergence gradually without exceeding the critical angle of the fiber; thus ideally, the taper of a fiber should not exceed 5°.

The patent to Sottini et al., U.S. Pat. No. 4,521,070, discloses a high efficiency laser light transmission device for high power radiation comprising a first optical fiber guide having a variable section coupled stiffly to the laser source, and a second optical fiber guide of uniform or variable section with the larger diameter near the output terminal. The two guides have a step index refraction distribution and at least a plastic material coating for strength and reliability. The second fiber guide is adaptable and replaceable depending on different use requirements; the first fiber guide is integrated with the laser source to form a "unique whole".

Although tapers have been used as power combiners to link a large diameter fiber to a small diameter fiber or a laser to a fiber, these devices are not designed to provide isolation between the laser and the rest of the system. The present invention can provide an isolation of up to 60 dB and an insertion/coupling loss of less than 3 dB.

SUMMARY OF THE INVENTION

It is therefore an object of the present invention to provide means for improving the isolation between the light source and an optical waveguide in an optical communications system.

It is a further object of the present invention to provide a device that can be used as an optical power combiner to permit coupling of multiple lines to a single output fiber.

The invention is a passive in-line device that provides a very high degree of isolation in optical fiber paths. Optical isolation is critical in high speed transmissions of optical signals, especially laser communications. Without adequate optical isolation, fluctuations in the laser output intensity and spectra will degrade signal transmission.

The optical power isolator of the present invention to a free space communication link's transmit optics or to an optical fiber by means of a tapered lens that is comprised of core and cladding material of different indices of refraction.

The core region exhibits a higher index of refraction so that light coupled into the large diameter end of the tapered lens is transmitted at low insertion loss to the small diameter end. The refractive index n of the core region may be of either the graded index or step index type. The lens tapering reduces the amount of light entering at the small diameter end which feeds back to the light source. This isolation is further improved by depositing an opaque disk at the center of the input surface on the large diameter end of the tapered lens.

DETAILED DESCRIPTION OF THE INVENTION

Figure 1:
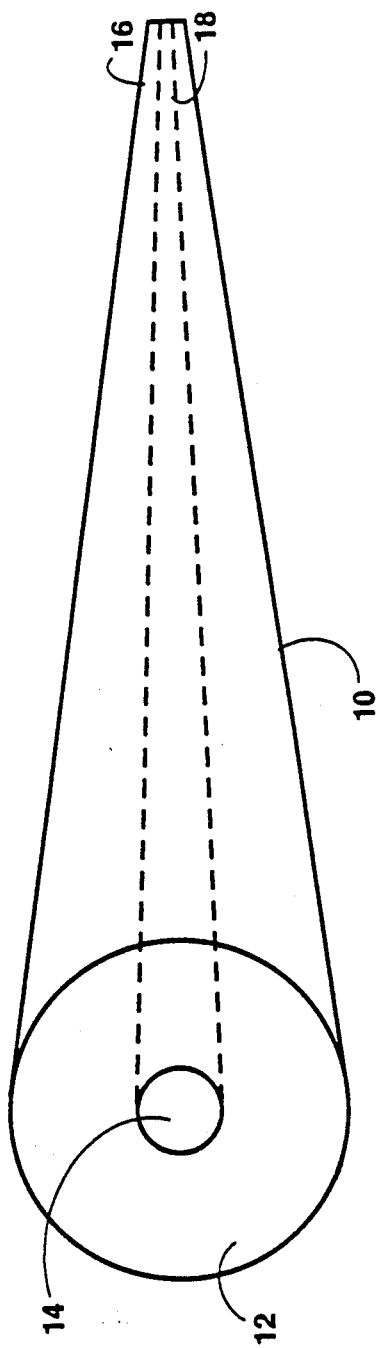
FIG. 1 is a perspective view of the optical power isolator of the present invention.
Figure 2B:
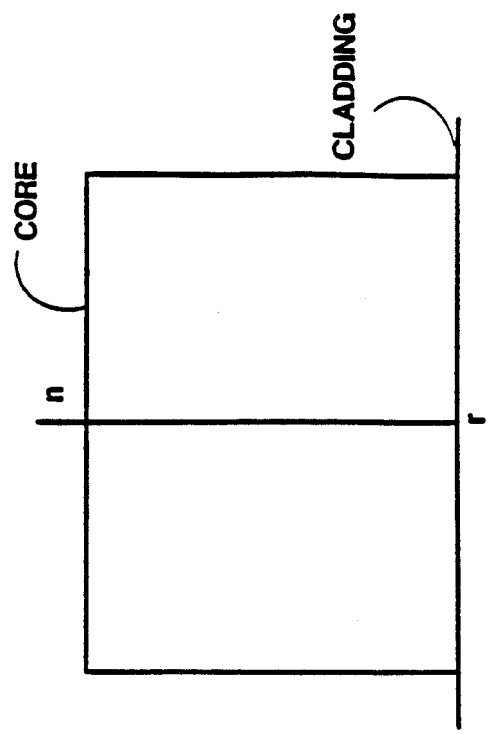
FIGS. 2(a) and 2(b) show refractive index distributions as a function of radial distance from the center of the tapered lens isolator for core regions exhibiting graded index and step index profiles.
Figure 2A:
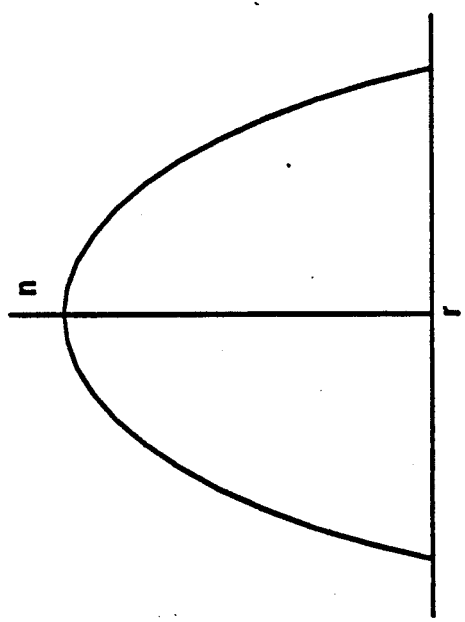

FIG. 1 shows schematically the tapered optical power isolator 10 of the present invention. The tapered isolator 10 is shown with input core 14 surrounded by a layer of cladding material 12 having a lower refractive index than that of the core 14. The cladding is tapered from the relatively large diameter of the cladding surrounding the core input to the relatively small diameter of the cladding 16 at the output of the core 18. The refractive index n of the core region may be of the graded index or step index type as shown in FIGS. 2a and 2b, respectively.

Figure 3:
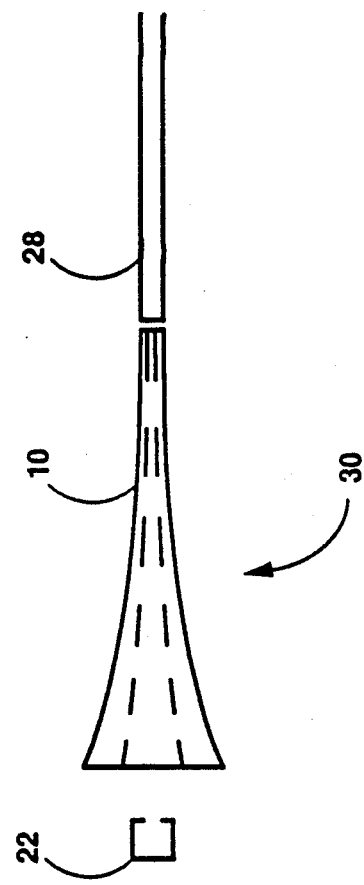
FIG. 3 shows a schematic of the optical isolator in a fiber optic communication system.

The tapered lens isolator as depicted in FIG. 3 may be used to link an optical source such as a semiconductor laser diode to a fiber optic transmission line. The isolator 10 permits low loss coupling of a laser diode 22 to an optical fiber 28 in the forward direction, but provides high loss coupling of light (reflected from splices, connectors, and terminations) from the optical fiber 28 to the laser diode 22. The tapered lens optical isolator 10 collects light from the laser diode 22 and funnels the light into an optical fiber 28. In the reverse direction, the beam diameter of light that enters the small diameter end of the isolator 10 due to reflections from the fiber transmission link is significantly enlarged as light traverses from the small diameter to the large diameter end of the isolator 10.

The irradiance profile of light emerging from the large diameter end of the isolator is approximately Gaussian. The irradiance function, $I(r)$, may be expressed as:

$$I(r) = I_0 e^{-2r^2/w^2} \quad (1)$$

where $I_0$ is a maximum of the distribution, r represents some radius along the irradiance profile, and w is the $1/e^2$ radius of the profile. If the aforementioned distribution is normalized so that the total power under the curve equals 1, then $I_0$ may be written as $$I_0 = 2/\pi w^2 \quad (2)$$

Radiant flux, or power contained in a given region of the curve may be found from $$P = \int_a^b \int_0^{2\pi} I(r) r \, dr \, d\theta \tag{3}$$

If a circular detector of radius $R_D$ is centered at $r=0$ of the irradiance profile, the optical power received by the detector is $$P = 1 - e^{-2R_D^2/w^2} \tag{4}$$

Figure 4B:
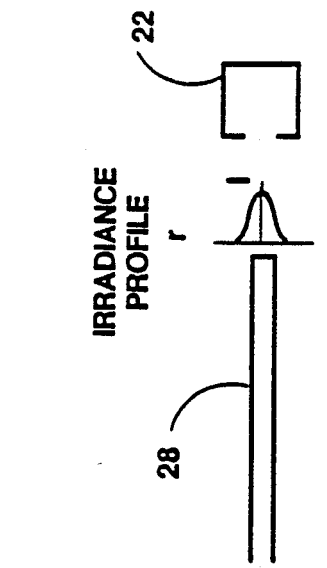
FIG. 4b shows an irradiance profile observed by a laser diode at an optical fiber-laser interface.
Figure 4A:
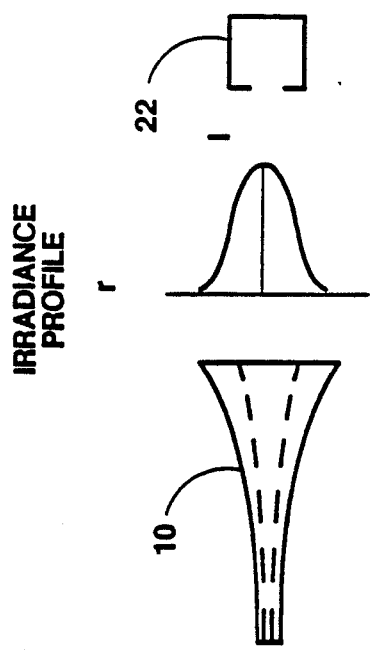
FIG. 4a shows an irradiance profile observed by a laser diode at the optical isolator-laser interface.

The irradiance profile observed by a laser diode 22 positioned at the center of the profile is displayed in FIG. 4a for an isolator-laser diode junction and in FIG. 4b for a fiber-laser junction. The aperture of a laser diode 22 is typically rectangular, but for simplicity the laser diode aperture is assumed circular with a radius $R_L$. The optical power coupled into the laser diode 22 from an isolator 10 with $1/e^2$ radius $w_i$ is $$P_i = 1 - e^{-2R_L^2/w_i^2} \tag{5}$$

and that coupled into a laser diode 22 at a fiber-laser diode junction is $$P_f = 1 - e^{-2R_L^2/w_f^2} \tag{6}$$

where $w_f$ is the $1/e^2$ radius of the optical fiber 28. The optical isolation $\alpha_I$ provided by the tapered lens isolator 10 is defined as $$\alpha_I = 10 \log (P_i/P_f) \tag{7}$$

Figure 5:
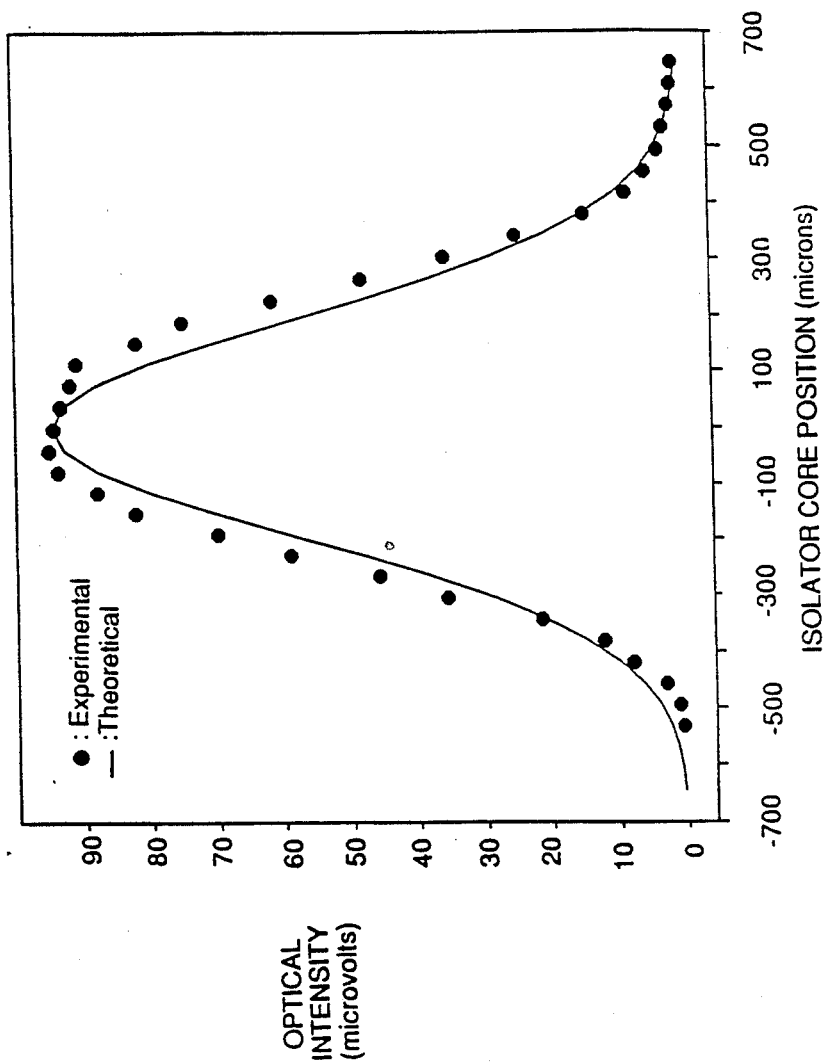
FIG. 5 is graph of the optical intensity at the input end of the optical power isolator as a function of detector position.

A near field intensity pattern of light exiting from the large diameter end of the isolator is shown in FIG. 5 which plots the normalized optical output intensity as a function of the position of the detector along the core diameter at the large diameter end. The origin of the abscissa is taken at the center of the optical isolator at the large diameter end. As can be seen in FIG. 5, a laser diode positioned at the center of the large diameter end of the isolator but separated from the surface of the isolator by some distance d collects a small percentage of the optical feedback. A typical laser diode exhibits an emitting region of approximately $5 \times 10^{-12}$ square meters. The tapered isolator would provide 32 dB of isolation for such a laser diode when interfaced to a 50 μm core diameter multimode fiber.

For a given laser diode aperture, optical isolation increases as the radius at the large end of the isolator increases and as the fiber radius decreases. For a given isolator output beam diameter, greater isolation should be obtained for single mode fiber links than for multimode links because single mode fibers exhibit significantly smaller diameters. Isolation values calculated from the above equations are provided in Table 1. These values were calculated on the basis of the isolator exhibiting a Gaussian irradiance profile as is approximately the case for tapered lenses that exhibit graded or step refractive index profiles.

TABLE 1
PREDICTED ISOLATOR PERFORMANCE

| Isolator Core Radius (mm) | Isolator $1/e^2$ Radius (mm) | Fiber Core Radius (μm) | Isolation (dB) |
|---|---|---|---|
| 1.60 | 1.0 | 25 | 36 |
| 1.30 | 0.8 | 25 | 34 |
| 1.00 | 0.6 | 25 | 32 |
| 0.65 | 0.4 | 25 | 28 |
| 1.60 | 1.0 | 4 | 48 |
| 1.30 | 0.8 | 4 | 46 |
| 1.00 | 0.6 | 4 | 43 |
| 0.65 | 0.4 | 4 | 40 |

Figure 6:
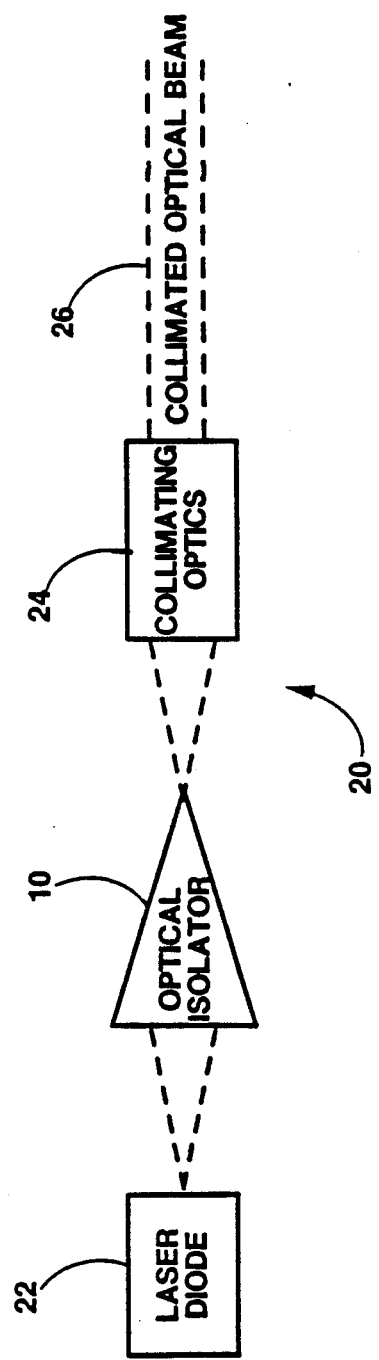
FIG. 6 shows a schematic of the isolator in a free space optical communication system.

In FIG. 6, the optical power isolator 10 is shown as part of a free space communications link 20 wherein it effectively couples the optical power from a laser diode 22 to free space transmit optics 24 to produce collimated optical beam 26. The tapered lens 10 when appropriately fabricated to interface with a laser diode 22 will effectively isolate the laser from optical feedback due to reflection and scattering from optical surfaces or from jamming. High isolation from reflected light entering the small diameter end of the tapered lens 10 is obtained because light entering the small diameter end spreads out when exiting the large diameter end of the isolator 10.

The isolator 10 is designed to interface directly with a laser diode 22 or to a laser diode exhibiting an optical fiber pigtail. Laboratory experiments were conducted on a prototype tapered lens isolator fabricated from a graded-index optical preform that when drawn yields an optical fiber with an outer glass diameter of 125 microns and a 0.4 core/cladding ratio. The tapered lens was drawn from the preform by rotating the cylindrical preform in a flame and applying tension in the axial direction. Standard glass cutting, grinding, and polishing techniques were employed to provide a flat, large diameter end face; a cleave and polish method was used to form the small diameter end. The tapered lens was housed in a cylindrical, nylon holder fitted with a SMA-style connector through which the small end of the isolator was inserted.

Figure 7:
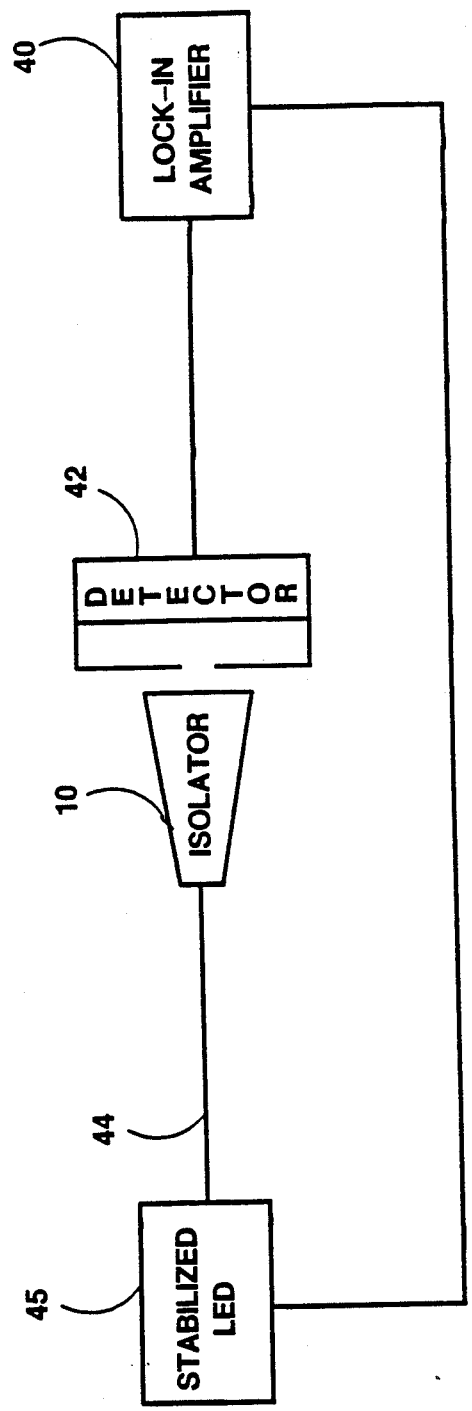
FIG. 7 shows the experimental set-up for the optical isolator experiments.

Isolation experiments were performed using the apparatus of FIG. 7 with optical power being measured as a function of position in both the radial and axial directions at the large end of the isolator 10. A typical output power profile for the radial direction was provided in FIG. 5. A reading of 95 microvolts on lock-in amplifier 40 resulted when a 35 micron diameter pin hole-covered silicon detector 42 was placed 1 mm from the center of the large end of the isolator 10. A reading of 19.6 millivolts on lock-in amplifier 40 was obtained when the detector 42 was centered on the 50 micron core diameter launch fiber 44. The light source was a stabilized light emitting diode 45 providing light at a wavelength of 850 nm at a reference frequency of 500 Hz. The measured isolation was 23.1 dB which correlated favorably with the 23.8 dB calculated using the theoretical isolation equation with $R_D = 17.5$ microns, $w_i = 0.4$ mm and $w_f = 15.4$ microns.

Figure 8:
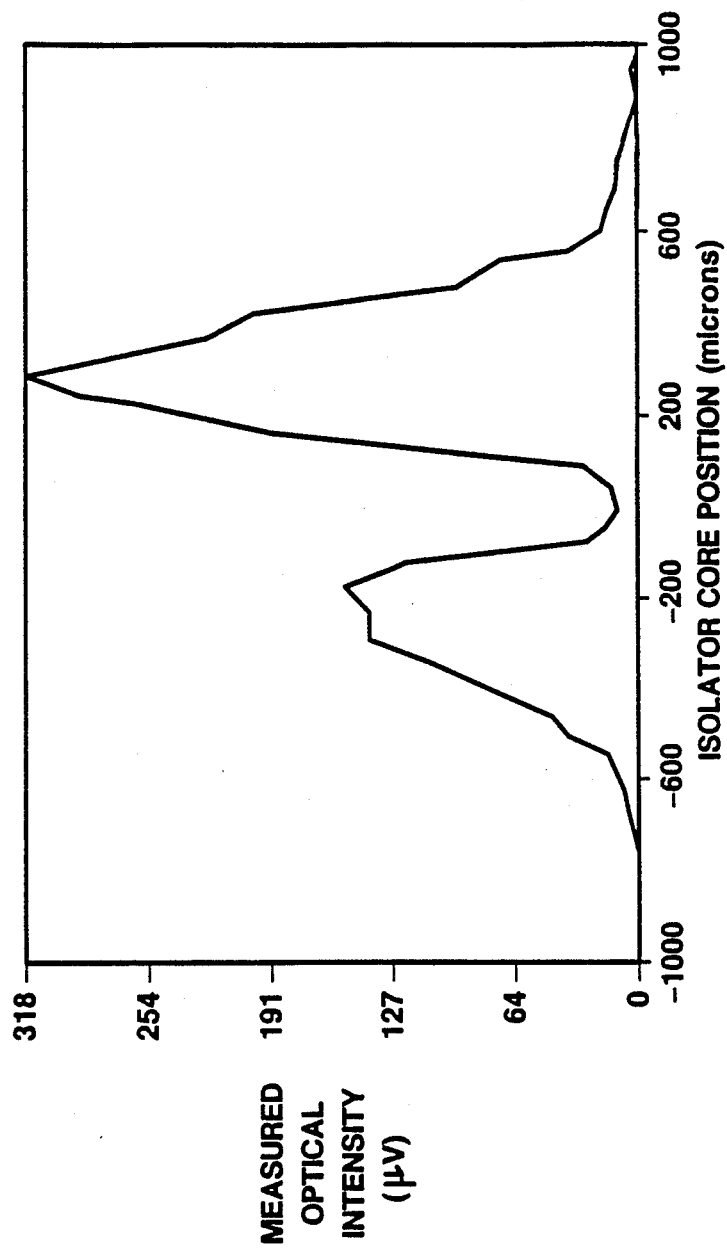
FIG. 8 is a graph of optical intensity at the input end of the optical power isolator as a function of detector position after depositing an opaque disk at its center.

The amount of isolation that can be obtained from the tapered lens isolator can be increased by depositing an opaque disk of small diameter at the center of the large diameter end of the tapered lens isolator. This places a notch in the output intensity profile of the large diameter end of the isolator as depicted in FIG. 8 where the origin is again taken at the center of the large diameter end. According to the results of Table 1, the notch can increase the isolation by 15 dB or more to provide an overall isolation greater than 60 dB. The tapered lens isolator comprising a glass (graded index) core and glass cladding has been characterized for insertion loss, optical isolation, and pulse dispersion. For an injected pulse of 1 nanosecond duration, the isolator exhibited an insertion loss of 3 dB and no observable pulse dispersion.

Figure 9:
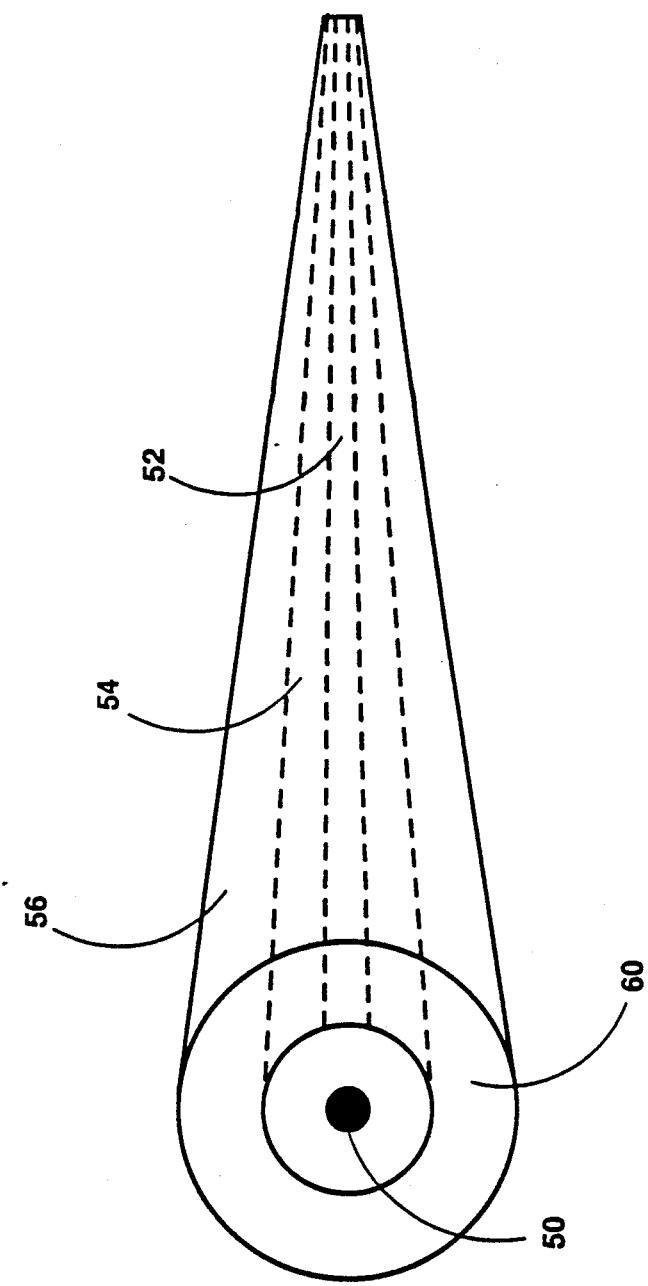
FIG. 9 is a perspective view of the three zone tapered wave guide optical isolator with opaque disk.

The notched configuration can be achieved by depositing an opaque disk of carbon-filled epoxy at the center of the large diameter end of the isolator. Alternatively, the notch may be realized by using a three-zone refractive index profile for the isolator as shown in FIG. 9. This isolator design consists of a central cladding zone 52, a transmission region 54 where light is confined, and an outer cladding region 56. The index of refraction of the transmission region 54 is greater than that of either of cladding zones 52, 56 to promote light transmission in the transmission region 54. A third configuration for enhanced optical isolation consists of the three-zone refractive index profile and an opaque disk 50 centered on the central cladding zone 52 at the large end of the isolator. An antireflection coating 60 can also be placed on the large diameter end to minimize reflection back to the laser diode.

An optimum notch zone diameter is sized as a compromise between the conflicting requirements of minimizing throughput attenuation in the forward direction and maximizing isolation between the laser diode and optical fiber. When a notched irradiance profile is used, the degree of isolation is dependent on launch separation which is defined as the distance separating the laser diode, or the laser diode with fiber pigtail, from the isolator end face. Isolation enhancement and throughput attenuation due to the presence of the opaque disk notch are provided in Table 2. The throughput attenuation values may be pessimistic from a system standpoint, since the tapered isolator may serve as a more effective coupler of optical power from laser diodes to optical fibers than other lensing methods.

TABLE 2

ISOLATION ENHANCEMENT AND THROUGHTPUT LOSS DEPENDENCE ON LAUNCH SEPARATION

| Launch Separation (mm) | Isolation Enhancement (dB) | Throughput Attenuation Due to Notch (dB) |
|---|---|---|
| 1.25 | 13.8 | 2.5 |
| 1.50 | 11.8 | 1.6 |
| 1.75 | 10.0 | 1.1 |
| 2.00 | 9.0 | 0.7 |
| 2.25 | 8.5 | 0.6 |
| 2.50 | 7.3 | 0.5 |

Figure 10:
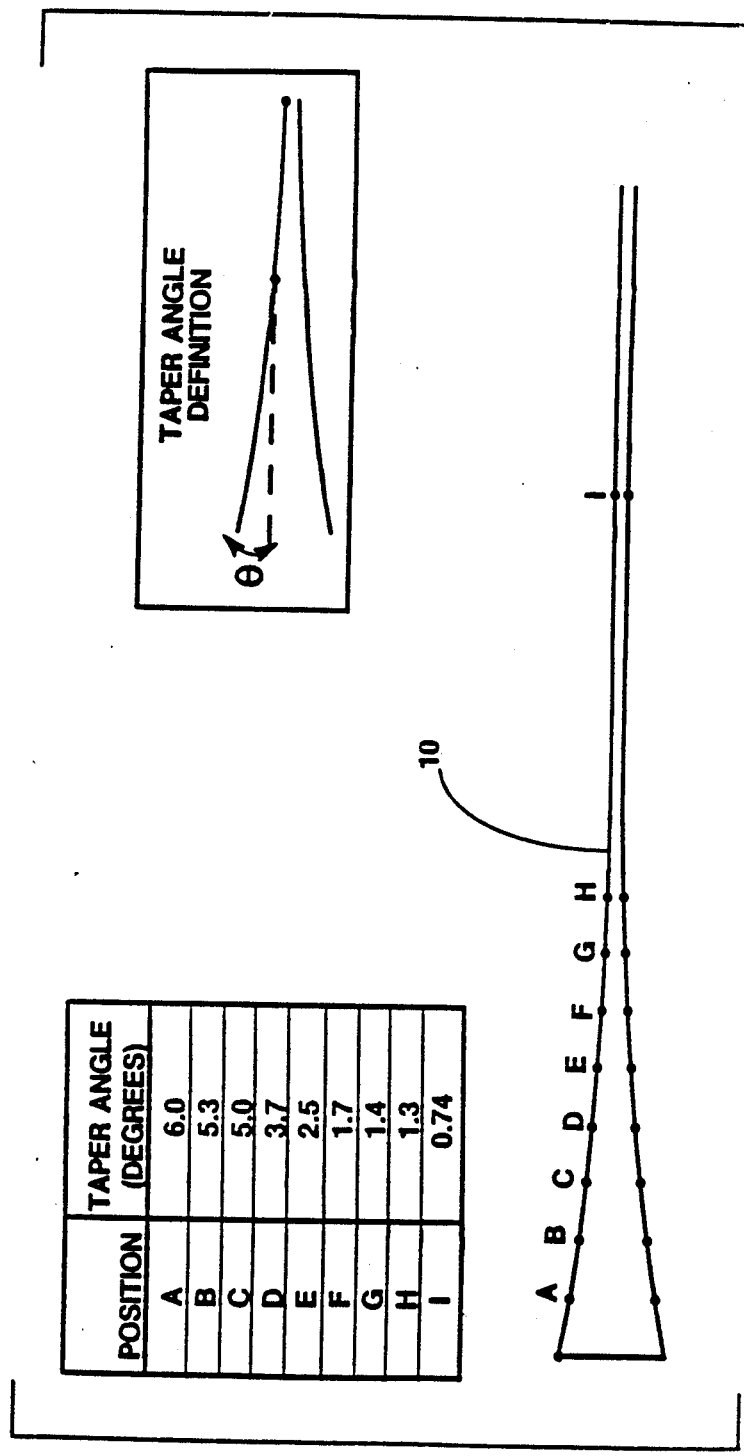
FIG. 10 shows typical dimensions and taper angles for the optical isolator.

Dimensions of the lens isolator are a function of the degree of isolation desired, the isolator-fiber interface method, the insertion loss requirements, and the fabrication method. A tapered lens optical isolator drawn from a doped silica preform exhibits a large diameter end that tapers in a nonlinear fashion to a diameter equal to that of an optical fiber over some length L. The change in taper angle over the length of a prototype isolator 10 is shown in FIG. 10. The insertion loss of the isolator depends on the change in taper angle per unit length. A tapered lens exhibiting a large change in taper angle per unit length will display a higher insertion loss than one with a small taper angle change.

The amount of isolation realized by a tapered lens is proportional to the core diameter at the large end of the device. From the standpoint of isolation performance, a large core diameter is desirable. However, to achieve low insertion loss, a small rate of taper angle change over the length of the isolator is preferred. These conflicting requirements must be bounded by the practical consideration that the device dimensions for a fiber optic length must be minimized. Typical values for isolator dimensions required to provide a given amount of isolation for a single mode fiber transmission link are provided in Table 3. These dimensions assume that the small diameter end of the isolator is 125 microns. Isolator length can be reduced if the small diameter of the isolator is increased (i.e., to 250 microns) and self-lensing techniques are employed for interfacing the isolator to the fiber. The calculated isolation values presented in Table 3 assume no notch in the isolator irradiance profile. Up to 15 dB of additional isolation may be obtained if a notch is employed.

TABLE 3

ISOLATOR DIMENSIONS FOR A SINGLE MODE FIBER LINK

| Isolator Length (cm) | Input Cladding Diameter (mm) | Input Core Diameter (mm) | $1/e^2$ Radius (mm) | Isolation (dB) |
|---|---|---|---|---|
| 7.0 | 4 | 0.26 | 0.08 | 27 |
| 8.0 | 6 | 0.38 | 0.12 | 31 |
| 9.5 | 10 | 0.64 | 0.20 | 35 |
| 11.5 | 20 | 1.28 | 0.40 | 40 |

The tapered lens optical power isolator may be fabricated from glass or polymers. The isolator may be tailored to provide optimum isolation/coupling performance for existing and anticipated laser diode optical wavelengths by employing appropriate materials of construction. For example, isolators fabricated from doped silicon dioxide may be adequate for the visible to near infrared spectrum (0.6 to 1.6 microns), but isolators fabricated from fluoride glass compositions may be required for transmission wavelengths in the 2 to 5 micron range. The possible combinations of core and cladding material include: (1) a graded index glass core surrounded by a glass cladding; (2) a step index glass core surrounded by a glass cladding; (3) a graded index glass core surrounded by a polymer cladding; (4) a step index glass core surrounded by a polymer cladding; (5) a step index polymer core surrounded by a polymer cladding; and (6) a graded index polymer core surrounded by a polymer cladding.

An isolator with a glass, graded index core and a glass cladding may be fabricated by first making a graded index starting rod using fiber optic preform fabrication technology. The starting rod may be fabricated by employing any one of several well established processes including the modified chemical vapor deposition process (MCVD), vapor axial deposition process (VAD), or the outside vapor deposition process (OVDP). The cladding may be fused silica ($SiO_2$), while dopants of one or more of the following oxides may be used to provide the graded index core profile; $GeO_2$, $P_2O_5$, $B_2O_3$, $TiO_2$, $ZrO_2$ and $SnO_2$.

The tapered shaped of the optical power isolator is achieved by utilizing a thermal source such as a graphite resistance or RF induction furnace to soften the starting rod and enable the rod to be drawn into the desired shape. Alternatively, the starting rod may be softened by means of a circular array of flames. The input and output ends of the tapered optical power isolator are subjected to conventional cut, grind and polish techniques so that flat, smooth surfaces at either end of the tapered optical power isolator are achieved. Alternatively, curved surfaces for the input and output ends may be obtained by employing glass grinding techniques for the large diameter input surface and grinding and localized heating methods at the small diameter output surface. Antireflection coatings may be applied to the input end to minimize direct reflection from the isolator input surface into the laser diode. The isolator may then be encapsulated and connectorized for implementation in a given optical system.

An all glass isolator with a step index refractive index profile may be fabricated from a starting rod made from any of the following processes: MCVD, VAD or OVDP. An alternative technique would be to collapse a fused silica tube around a glass rod of higher refractive index. Subsequent processing would be identical to that described previously for the graded index isolator.

Figure 11B:
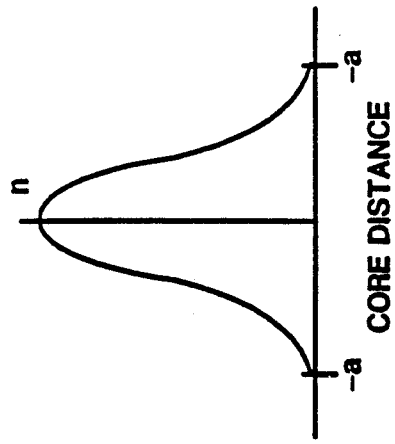
FIGS. 11(a) to 11(d) show tapered graded index distributions as a function of axial position for a starting rod of fixed diameter.
Figure 11D:
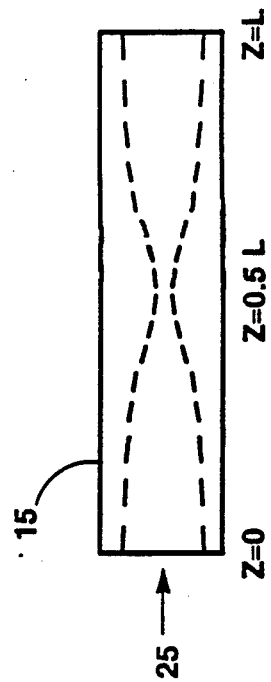
Figure 11A:
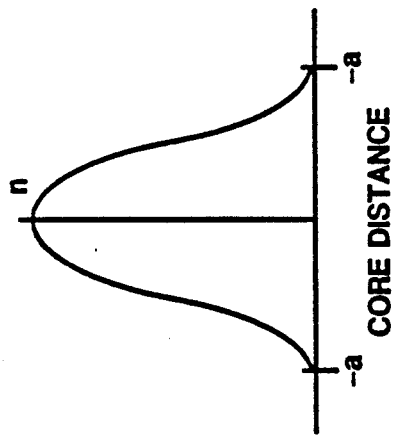
Figure 11C:
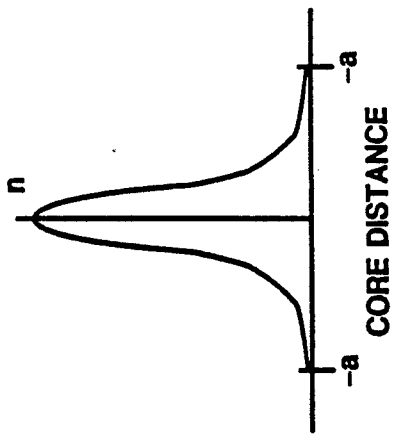

An optical isolator may be fabricated that achieves isolation due to both a physical taper and an inherent tapered graded-index profile. A starting rod for such an isolator may be constructed to exhibit a tapered graded-index profile with respect to starting rod axial location z, as depicted in FIG. 11. This may be accomplished by employing a silica starting tube of length L and inner diameter d, where d exhibits a minimum value at $z=0$ and $z=L$ and a maximum value at $z=L/2$. Doped silica layers of axially-varying thickness are then deposited on the curved inner surface of the starting tube. The starting tube is then collapsed to form a starting rod of constant outer diameter D that exhibits a tapered graded-index profile. FIG. 11a shows the refractive index profiles at $z=0$ and $z=L$; FIG. 11b shows the refractive index profile at $z=0.25L$ and $z=0.75L$; FIG. 11c shows the refractive index profile at $z=0.5L$; and FIG. 11d shows the light propagation path 25 through the starting rod 15 before the drawing. This starting rod may then be drawn to form a physical taper. The isolation provided by this device is a composite of the physical taper and the inherent, tapered graded-index profile. This design may provide excellent isolation for reduced isolator lengths.

Figure 12:
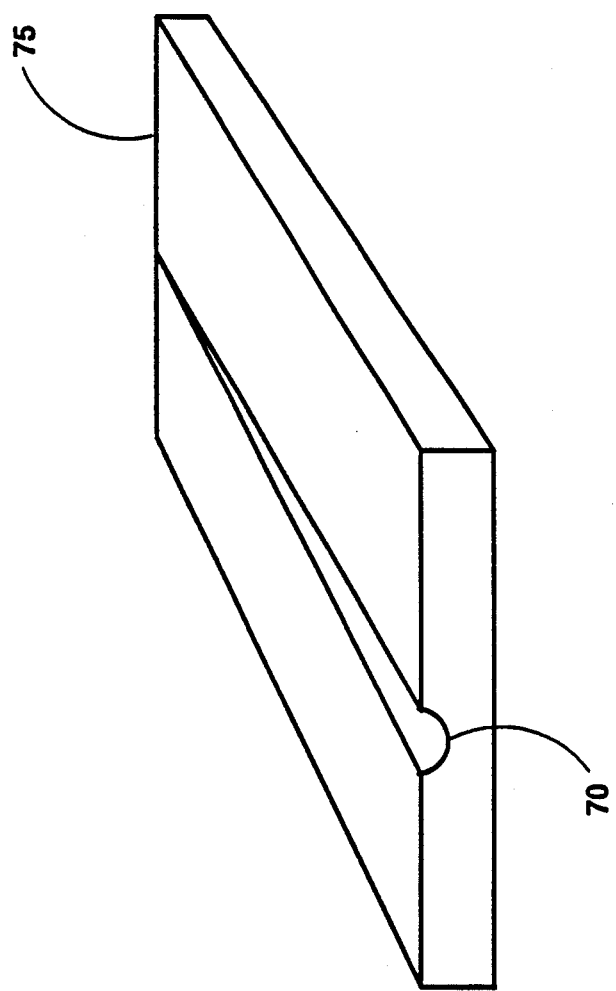
FIG. 12 is an alternate embodiment of the tapered lens isolator in which the taper is etched or milled on a substrate.

An optical isolator may also be fabricated by employing thin film deposition techniques utilized in the manufacture of integrated optics devices. A tapered region 70 may be etched or milled into a silicon dioxide ($SiO_2$) substrate 75, as depicted in FIG. 12. Thin film layers of doped $SiO_2$ may be deposited on the grooved substrate 75 to develop the desired refractive index profile. Subsequent to layered film deposition, the substrate 75 would be ground and polished. Two finished substrates would be joined by means of index-matching epoxy, or by other suitable means, to form an optical isolator. This approach provides for considerable flexibility in tailoring notched refractive index profiles for specific applications. The thin film deposition technique would permit the fabrication of arrays of optical isolators on a single substrate. This approach permits inclusion of an optical isolator on integrated optics circuit substrates. Moreover, the approach may be readily converted to a large scale, high volume production process.

The glass/polymer isolators can be fabricated by drawing a graded index or homogeneous index glass rod into a tapered configuration and then encapsulating the taper with a polymer that exhibits an index of refraction less than the glass taper.

Polymer core/polymer cladding isolators may be fabricated by means of injection molding or other well-known casting techniques.

To fabricate a step index polymer core/polymer cladding by injection molding would require the use of an injection molding tool having an exterior portion to establish the outer dimensions of the cladding of the isolator and an interior portion to establish the outer dimensions of the core region. Polymethylmethacrylate (PMMA) material would be injected into the exterior portion of the tool to form the cladding region first. Following removal of the interior portion of the tool, PMMA material having a higher index of refraction would be injected into the vacated portion to form the core region of the isolator.

The device of this invention can be utilized to couple a plurality of single mode or multimode laser diodes to an optical communication or sensor system and still provide excellent isolation. This can be accomplished by placing an array of laser diodes at the large diameter end of the power isolator or by "pigtailing" laser diodes with optical fibers and placing the fibers in an array at the large diameter end of the power isolator.

In addition to using either a connector or fusion splice to interface the optical isolator to an optical fiber, the tip of the output end of the isolator can be heated to form a hemispherical end rather than a flat end which enables self-lensing focusing light from the isolator onto the optical fiber core.

I claim:

1. A device for improving the isolation in an optical communications system between a coherent optical source and a transmission link comprising a tapered lens and including a core region and cladding material, said tapered lens having a large diameter input end and a small diameter output end wherein said core region exhibits a higher index of refraction than said cladding material such that light coupled into said input end is transmitted at low insertion loss to said output end, and light entering said output end and which feeds back to said coherent optical source is reduced.

2. The device of claim 1 further comprising an opaque disk deposited on the center of the input surface of said large diameter input end of said tapered lens.

3. The device of claim 1 wherein said tapered lens includes a glass core having a step refractive index distribution and it is surrounded by a glass cladding material.

4. The device of claim 1 wherein said tapered lens includes a glass core having a step refractive index distribution and is surrounded by a polymer cladding material.

5. The device of claim 1 wherein said tapered lens includes a polymer core having a step refractive index distribution and is surrounded by a polymer cladding material.

6. The device of claim 1 wherein said tapered lens includes a glass core having a graded refractive index distribution and is surrounded by a glass cladding material.

7. The device of claim 1 wherein said tapered lens includes a glass core having a graded refractive index distribution and is surrounded by a polymer cladding material.

8. The device of claim 1 wherein said tapered lens includes a polymer core having a graded refractive index distribution and is surrounded by a polymer cladding material.

9. An efficient optical communication system comprising:
   a coherent optical source;
   a transmission link; and
   a tapered lens disposed between said coherent optical source and said transmission link, and having a large diameter input end and small diameter output end, and further including a core region and surrounding cladding material wherein light coupled into said input end from said optical source is transmitted with low insertion loss to said output end, and light entering said output end from said transmission link is attenuated before feeding back to said optical source.

10. The device of claim 9 wherein said coherent optical source includes at least one semiconductor laser diode.

11. The device of claim 9 wherein said optical source includes at least one semiconductor laser diode having an optical fiber pigtail.

12. The device of claim 9 wherein said transmission link includes at least one optical fiber.

13. The device of claim 9 wherein said transmission link includes collimating optics components.

14. An optical isolator for improving the isolation between a coherent optical source and a transmission link in an optical communications systems comprising a tapered lens, said tapered lens having a large diameter input end and a small diameter output end, and including a central cladding zone, a transmission region surrounding said central cladding zone, and an outer cladding zone surrounding said transmission region wherein said transmission region exhibits a higher index of refraction than either of said central and outer cladding zones to enhance light propagation in the transmission region.

15. The optical isolator of claim 14 wherein said tapered lens further comprises an opaque disk centered on said central cladding zone on said large diameter input end.

* * * * *